United States Patent [19]

Schuster

[11] 4,226,734

[45] Oct. 7, 1980

[54] COOLING, LUBRICATING, AND CLEANING AGENT

[76] Inventor: Dietrich Schuster, 6741 Frankweiler/pflaz, Am Kaefernberg 7, Fed. Rep. of Germany

[21] Appl. No.: 913,848

[22] Filed: Jun. 8, 1978

[30] Foreign Application Priority Data

Dec. 22, 1977 [DE] Fed. Rep. of Germany ....... 2757322

[51] Int. Cl.³ .............................................. C10M 1/06
[52] U.S. Cl. .................................. 252/49.3; 252/49.5; 252/49.6; 260/404; 260/462 R; 424/185
[58] Field of Search .......................... 260/462 R, 404; 252/49.3, 49.5, 49.6; 424/185

[56] References Cited

U.S. PATENT DOCUMENTS

| | | | |
|---|---|---|---|
| 2,052,192 | 8/1936 | Piggott | 260/462 R |
| 2,216,618 | 10/1940 | Katz | 260/462 R X |
| 2,408,332 | 9/1946 | Morgan | 260/462 R |
| 2,441,063 | 5/1948 | Gilmann | 260/404 X |
| 3,429,909 | 2/1969 | Schuster | 260/462 R |
| 3,544,614 | 12/1970 | Schwartz | 260/462 R |
| 3,719,598 | 3/1973 | King | 252/49.3 X |
| 3,764,593 | 10/1973 | Schuster | 260/462 R |
| 3,969,236 | 7/1976 | Waldstein | 252/49.5 |
| 4,022,713 | 5/1977 | Waldstein | 252/49.5 |

FOREIGN PATENT DOCUMENTS

1620447   3/1976   Fed. Rep. of Germany ........... 260/404

OTHER PUBLICATIONS

Aalbers, Publishers Wed. G. Van Soest N.V. Amsterdam, pp. 26 to 31 (1966).

*Primary Examiner*—Helen M. S. Sneed
*Attorney, Agent, or Firm*—Staas & Halsey

[57] ABSTRACT

A cooling, lubricating, and cleaning agent for use by the metalworking industry produced by the condensation reaction between an excess amino alcohol with boric acid and the addition of a carboxylic acid to the complex, boron containing diamine formed in the reaction system.

4 Claims, No Drawings

COOLING, LUBRICATING, AND CLEANING AGENT

BACKGROUND OF THE INVENTION

The metal-working industry, in order to accomplish shaping processes on metals, no matter whether they are made by cutting or non-cutting, needs coolants which facilitate the shaping processes and which, in particular, are in a position to eliminate the heat energy occurring, and to simultaneously and subsequently protect the shaped metal from corrosion.

As is well known, such agents are generally called cooling—cutting compounds or else cooling lubricants. The development of these cooling—cutting compounds was particularly rapid during the past decade, because of the general tendency for the automation of the finishing processes, whereby this development led to products which in their essence and composition may be defined as colloid-dispersed systems of non-saponifiable mineral oils in mixture with surface-active substances in water.

As a result of automating the production within the metal-working plants, it has become necessary to depart from the formerly customary use of pure mineral oil emulsions, which had been produced from petroleum sulfonates and mineral oils, since these mineral oil emulsions no longer satisfied the rising demands. On the one hand, these mineral oil emulsions, because of their high content of mineral oil, had only a poor or unsatisfactory cooling effect. On the other hand, these mineral oil emulsions, because of their low capacity for dilution with water, also had only a poor or unsatisfactory corrosion protection behavior. A third disadvantage of these mineral oil emulsions was their low resistance against micro-organisms, resulting in the undesirable formation of decaying substances, odorous annoyances and a high strain on the environment.

The development of better cooling-cutting agents which resulted in less of a strain on the environment and contained less mineral oil led to the use for the first time of complex soaps of ethanol amines with natural fatty acids, which were obtained by special processes under the influence of boric acid at temperatures between 230° and 200° C. These new cooling, cutting agents were used with great success in the metal-working industry. For example, in metal processing or metal forming plants, in which the former coolants could be kept only a few weeks with the addition of preservatives, operating lifetimes of 80 weeks and more achieved with the above described novel products, without there being any need of adding preservatives. This advantage alone provides a tremendous decrease in the costs, and enables a manifold increase in the effects of automation. Furthermore, the skin allergies of the workers, caused by the preservatives used, disappeared completely when the above described novel products were substituted.

It was further observed that using the above mentioned novel cooling-cutting agents, (representing colloidal-disperse systems), allowed one to carry out cutting operations on highly alloyed steels for airplane turbines; these operations not being achieved up to that time and which were not even considered possible.

Therefore, these new, above described cooling-cutting agents have been found to be very satisfactory for numerous applications.

However, in considering particular technical applications, it became apparent that certain disadvantages still exist for certain areas of usage which could not be eliminated by the use of the above described prior art cooling-cutting agents.

The reason for the problems with the prior art agents is that all known fatty acids form lime soaps which lead to deposits. These deposits in turn, together with the mineral oil coming from the machines, lead to residues. These residues are not removable or removable only with great difficultly because of their insolubility in water.

These problems at first seem insignificant but lately they have acquired extraordinary importance in practice, and to be sure, expecially in the case of machines and finishing processes that are controlled numerically. Their manufacturing output may be interrupted or even stopped by the adhesion of a small metal splinter to the slideways.

Furthermore, the precipitated lime soaps, which may be deposited in the supply line systems, form a nutrient medium for microorganisms. These microorganisms consume the organic components of the lime soaps and leave insoluble calcium oxide or insoluble calcium carbonates behind. These lime deposits, which then solidify in the pipe line systems, lead to the pipe lines growing shut radially from the outside of the pipe lines towards the inside and eventually plugging up the pipe lines completely.

SUMMARY OF THE INVENTION

The object of the present invention is to create cooling, lubricating and cleaning agents for the metalworking industry as well as to create a process for their production, which are particularly suitable for numerically controlled metalworking machines, whereby the adhesion of even small chips of metal is prevented and further preventing a precipitation of lime soaps, thus eliminating the possibility of plugged up supply lines in the system.

It was found that the technical task described above, is solved according to the invention, by creating new cooling, lubricating and cleaning agents by means of a certain condensation reaction. These new cooling, lubricating and cleaning agents have the above described positive characteristics.

The condensation reaction is produced between an excess amino alcohol with boric acid and the addition of a carboxylic acid to the complex, boron containing diamine, formed in the reaction system. The carboxylic acid consists of an oxaethane carboxylic acid and expecially of lauryl-poly-1-oxapropinic acid. Concerning the connecting class of the oxaethane carboxylic acids used, we refer to the standard work by Dr. J. G. Aalbers, 1966, Publishers WED. G. Van Soest N. V. Amsterdam, (especially to pp. 26 to 31).

Generally stated, the oxaethane carboxylic acids are obtained by ethoxylization of fatty alcohols and subsequent conversion with chloracetic acid sodium.

Concerning the use of the new cooling, lubricating and cleaning agents of the invention and particularly the details of the use, we cite German Pat. No. 16 20 447 as the nearest prior art, the owner of which being the applicant of the present application.

Surprisingly, it was further found that even the combination of the hitherto customary fatty acids, (for example, lauric acid or myristic acid with an oxaethane carboxylic acid), will lead to cooling, lubricating and cleaning agents for the metalworking industry capable of solving the above-mentioned technical problems.

DESCRIPTION OF THE PREFERRED EMBODIMENTS

The essence of the present invention will now be explained further in the following paragraphs on the basis of embodiments, whereby the surprisingly positive effects are also contained in the embodiments.

EXAMPLE 1

Condensation reaction with diethanolamine, boric acid and lauryl (poly-1 oxapropane) oxyethane carboxylic acid.

The products are in the following mutual molar ratio:
7 moles diethanolamine
3.3 moles boric acid (=orthoboric acid)
1 mole lauryl (poly-1 -oxapropane) oxaethane carboxylic acid.

The quantity of water condensed out amounts to 8.3 mole.

The condensation product is bright yellow and viscous, and is dissolved clearly in water with a pH value of 9.0.

A basic emulsion is produced with spindle oil, by mixing the above-noted product with water in a ratio of 2:1, and then adding 2 to 3 parts of spindle oil. This clear basic emulsion becomes transparent to milky white in color when dissolved in water. Such a product has an excellent corrosion-impeding effect and fulfills the conditions of the Herbert-test (see German Pat. No. 16 20 447) even in a dilution of 1:100.

EXAMPLE 2

Condensation reaction with diethanolamine, boric acid, lauryl (poly-1-oxapropane) oxaethane carboxylic acid and a vegetable mixed oil fatty acid.

The products are in the following mutual molar ratio:
8 moles diethanolamine
1 mole boric acid (=orthoboric acid)
3 moles lauryl (poly-1-oxapropane) oxaethane carboxylic acid
1 mole vegetable mixed oil fatty acid.

The quantity of water condensed out amounts to 11.1 mole.

The condensation product is a brownish gold clear liquid, and is dissolved clearly in water having a pH value of 9.0.

Whenever equal parts of the above-noted product are mixed with spindle oil, a viscous clear solution will result, which turns a milky white to transparent color when dissolved in water. The product has an excellent corrosion-impending effect and fulfills the conditions of the Herbert-test even in a dilution of 1:100.

EXAMPLE 3

Condensation reaction with monoethanolamine, boric acid and lauryl (poly-1-oxapropene) oxaethane carboxylic acid.

The products are in the following molar relationship to one another:
7 mole monoethanolamine
3.3 mole boric acid (=orthoboric acid)
1 mole lauryl (poly-1-oxapropene) oxaethane carboxylic acid.

The condensation product is yellow and solidifies after cooling off. It forms a white emulsion when dissolved in water having a pH value of 9.0.

A mixture of one part water with one part spindle oil results in a white emulsion. The product has an excellent corrosion-impeding effect and fulfills the conditions of the Herbert-test even in a dilution of 1:100.

EXAMPLE 4

Condensation reaction of diethanolamine, boric acid lauryl (poly-1-oxapropene) oxaethane carboxylic acid and mixed oil fatty acid.

The products are in the following molar relationship to one another:
9 mole diethanolamine
3 mole boric acid (=orthoboric acid)
1 mole lauryl (poly-1-oxapropene) oxaethane carboxylic acid
3 mole mixed oil fatty acid.

The quantity of water condensed out amounts to 5 mole.

The condensation product is brown and relatively viscous. It turns milky white in color when dissolved in water having a pH value of 9.0.

Mixed with equal parts of spindle oil and water, there results a thick, fat-like, white emulsion, which remains white when dissolved in water. One will obtain a better solubility of the basic emulsion, when an additional 4% of free lauryl (poly-1-oxapropane) oxaethane carboxylic acid is added to 100 parts of the original emulsion. The product has an excellent corrosion-impending effect and fulfills the conditions of the Herbert-test even in a dilution of 1:100.

I claim:

1. A cooling, lubricating and cleaning agent, comprising the agent formed by the condensation reaction of an excess diethanolamine with boric acid, and the adding of lauryl (poly-1-oxapropene) oxaethane carboxylic acid, wherein the products used in forming said agent are in the following mutual molar relationship:
7 moles diethanolamine
3.3 moles boric acid
1 mole lauryl (poly-1-oxapropene) oxaethane carboxylic acid.

2. A cooling, lubricating and cleaning agent, comprising the agent formed by the condensation reaction of excess diethanolamine with boric acid, and the adding of lauryl (poly-1-oxapropene) oxaethane carboxylic acid and a fatty acid, wherein the products used in forming said agent are in the following mutual molar relationship:
8 moles diethanolamine
1 mole boric acid
3 moles lauryl (poly-1-oxapropene) oxaethane carboxylic acid
1 mole fatty acid.

3. A cooling, lubricating and cleaning agent, comprising the agent formed by the condensation reaction of excess monoethanolamine with boric acid, and the adding of lauryl (poly-1-oxapropene) oxaethane carboxylic acid, wherein the products used in forming said agent are in the following mutual molar relationship:
7 moles monoethanolamine
3.3 moles boric acid
1 mole lauryl (poly-1-oxapropene) oxaethane carboxylic acid.

4. A cooling, lubricating and cleaning agent, comprising the agent formed by the condensation reaction of excess diethanolamine with boric acid, and the adding of lauryl (poly-1-oxapropene) oxaethane carboxylic acid and a fatty acid, wherein the products used in forming said agent are in the following mutual molar relationship:
9 moles diethanolamine
3 moles boric acid
1 mole lauryl (poly-1-oxapropene) oxaethane carboxylic acid
3 moles fatty acid.

* * * * *